US006324438B1

(12) United States Patent
Cormier et al.

(10) Patent No.: US 6,324,438 B1
(45) Date of Patent: Nov. 27, 2001

(54) METHODS AND APPARATUS FOR RAPIDLY PROTOTYPING THREE-DIMENSIONAL OBJECTS FROM A PLURALITY OF LAYERS

(75) Inventors: Denis R. Cormier; James B. Taylor, both of Raleigh; Harvey A. West, II, Rolesville, all of NC (US)

(73) Assignee: North Carolina State University, Raleigh, NC (US)

(*) Notice: Subject to any disclaimer, the term of this patent is extended or adjusted under 35 U.S.C. 154(b) by 0 days.

(21) Appl. No.: 09/309,424

(22) Filed: May 11, 1999

(51) Int. Cl.[7] .................................................. G06F 19/00
(52) U.S. Cl. ............................. 700/118; 700/98; 264/401
(58) Field of Search .................................. 700/120, 119, 700/118, 98, 163, 182; 264/401; 156/89; 345/31

(56) References Cited

U.S. PATENT DOCUMENTS

| 4,675,825 | | 6/1987 | DeMenthon | 700/159 |
|---|---|---|---|---|
| 4,752,352 | | 6/1988 | Feygin | 216/33 |
| 5,514,232 | | 5/1996 | Burns | 156/64 |
| 5,663,883 | * | 9/1997 | Thomas et al. | 700/119 |
| 5,779,833 | | 7/1998 | Carley et al. | 156/89.11 |
| 5,818,718 | | 10/1998 | Thomas et al. | 700/119 |
| 5,820,811 | | 10/1998 | Murakami et al. | 264/401 |
| 5,847,958 | | 12/1998 | Shaikh et al. | 700/119 |
| 6,021,358 | * | 2/2000 | Sachs | 700/98 |
| 6,070,107 | * | 5/2000 | Lombardi et al. | 700/119 |
| 6,129,872 | * | 10/2000 | Jang | 264/75 |

FOREIGN PATENT DOCUMENTS

| 19542328A1 | 5/1997 | (DE). |
|---|---|---|
| 0633129A1 | 1/1995 | (EP). |
| 0738583A1 | 10/1996 | (EP). |
| 2307699 | 6/1997 | (GB). |
| WO 98/09798 | 3/1998 | (WO). |
| WO 99/34976 | 7/1999 | (WO). |

* cited by examiner

*Primary Examiner*—William Grant
*Assistant Examiner*—Kidest Bahta
(74) *Attorney, Agent, or Firm*—Myers Bigel Sibley & Sajovec

(57) ABSTRACT

Methods and apparatus are provided for rapidly prototyping a three-dimensional object from a plurality of sequential layers wherein each layer is cut after being fused with a preceding layer. A first sequential layer having a peripheral edge and an exposed face is cut from a first sheet of material using a machine tool path generated from a CAD model of the object. A solvent is then applied to a face of a second sheet of material. The second sheet of material is placed in contacting face-to-face relation with the first sequential layer such that the solvent fuses the face of the second sheet of material with the exposed face of the first sequential layer. A second sequential layer having a peripheral edge and an exposed face is cut from the second sheet of material along a respective machine tool path generated for the second sequential layer. The above procedure is repeated until all remaining layers of the prototype part are produced.

50 Claims, 12 Drawing Sheets

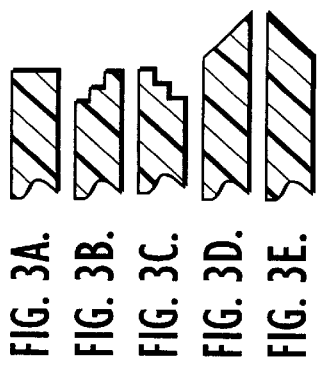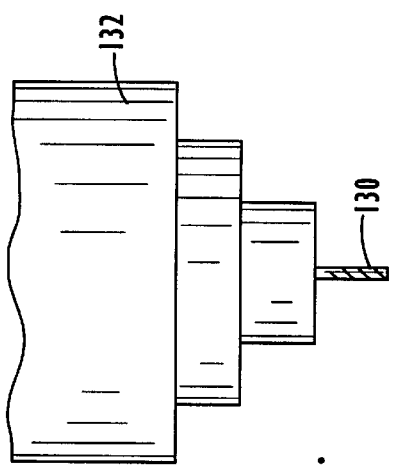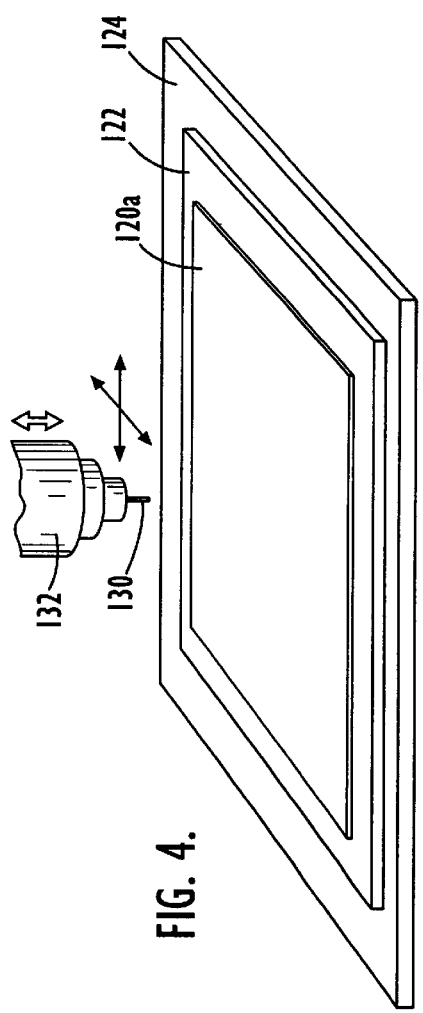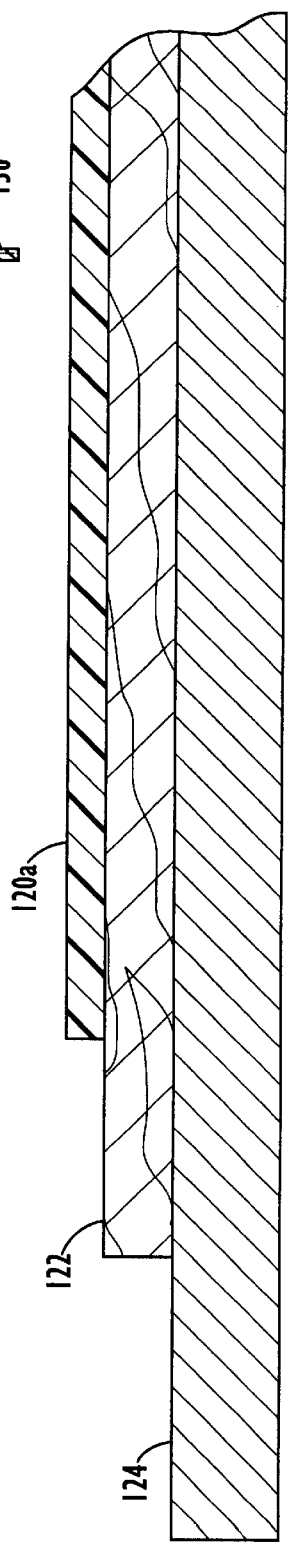
FIG. 3A.
FIG. 3B.
FIG. 3C.
FIG. 3D.
FIG. 3E.
FIG. 4.
FIG. 5.

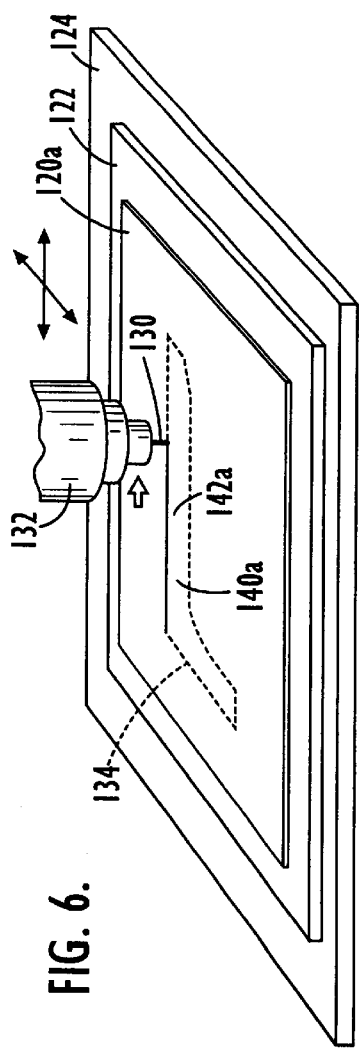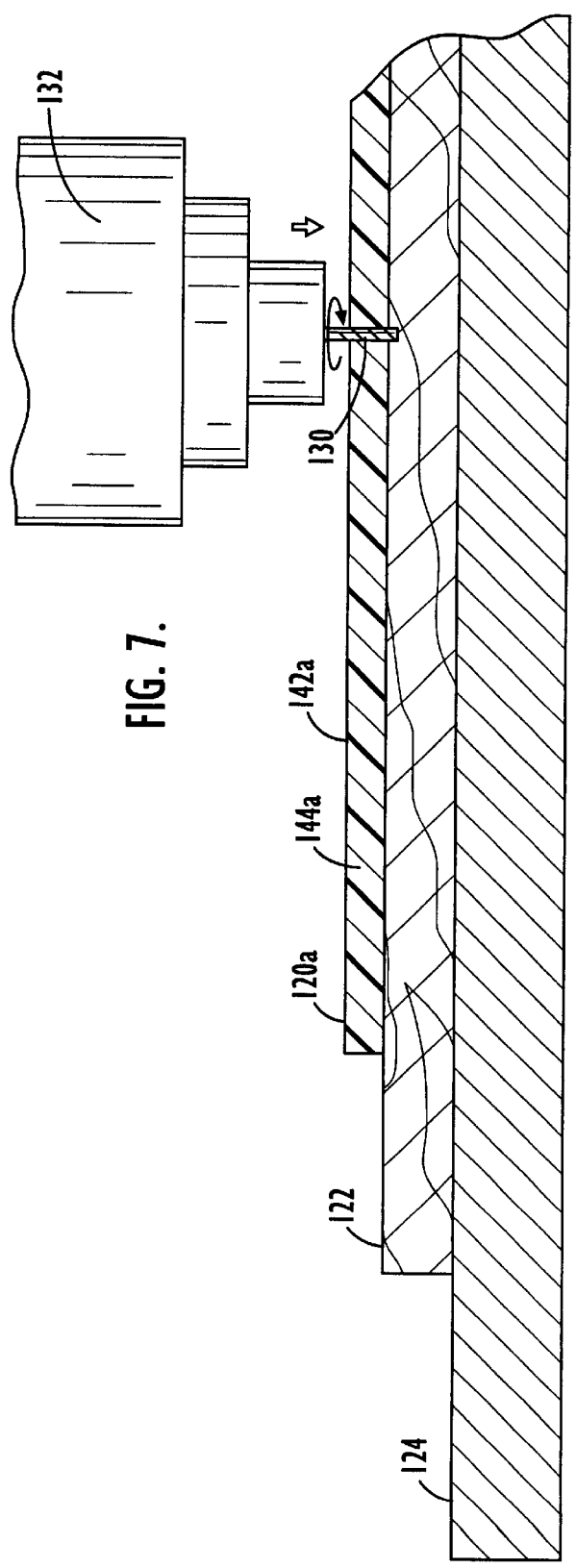

US 6,324,438 B1

METHODS AND APPARATUS FOR RAPIDLY PROTOTYPING THREE-DIMENSIONAL OBJECTS FROM A PLURALITY OF LAYERS

FIELD OF THE INVENTION

The present invention relates generally to prototype modeling and construction and, more particularly, to rapid prototype modeling and construction.

BACKGROUND OF THE INVENTION

More and more manufacturers are using rapid prototyping techniques to facilitate bringing products to market with decreasing lead times and development costs. The term "rapid prototyping" conventionally defines automatic techniques for producing a solid three-dimensional object via a computer model. Specifically, a computer model is utilized to produce thin plane cross-sections of a part. These crosssections, or layers, are then used as the building blocks of the prototype part with each of the layers being cut or formed separately.

Rapid prototyping techniques typically start with a computer aided design (CAD) representation or model of a part. The CAD model is then "sliced" graphically into a series of parallel cross sections spaced at a distance equal to the eventual thickness of the physical layers used to make the prototype part. Each physical layer is registered with respect to previous layers, and layers are bonded together via process-specific mechanisms such as melting, gluing, and sintering. For example, U.S. Pat. No. 5,847,958 to Shaikh et al. describes a process for rapidly prototyping a contoured part wherein a three-dimensional CAD model of the part is created and then sectioned into a plurality of graphical slabs. Physical solid members are machined for each graphical slab and then are joined together to replicate the CAD model. U.S. Pat. No. 5,779,833 to Cawley et al. describes a process for creating ceramic parts from a plurality of contoured layers that are separately made and then secured to each other via a sintering process.

There are considerable benefits associated with rapid prototyping. These include: reducing the amount of time required for a product to reach the market; enhancing the ability to perform functional, form and fit testing of a part; and facilitating low cost, small volume production.

Despite these benefits, current rapid prototyping processes suffer from several drawbacks. First, rapid prototyping equipment is quite expensive, with costs typically ranging between $100,000 and $500,000. Another drawback associated with conventional rapid prototyping is the length of time typically required to produce a prototype part. Conventional rapid prototyping techniques can take up to twenty-four hours to produce a single prototype part once a computer model of the part has been created.

A third drawback associated with conventional rapid prototyping is the general inability to produce strong parts that can be used directly in products or assemblies. Most current rapid prototyping processes produce relatively low-strength parts, typically out of paper, wax, or other low-strength materials. Rapid prototyping processes that do utilize stronger materials such as plastics, ceramics, and metals, often suffer from material weakness due to porosity, brittleness, incomplete bonding of layers, and even degradation over time.

Yet another drawback associated with conventional rapid prototyping is the inability to produce parts having accurate and precise geometries. For example, curved surfaces often have a "stair-step" appearance when multiple layers are assembled together. In addition, parts having undercut regions can be difficult to produce via the assembly of multiple layers. This is because it may be difficult to support layers that overhang undercut regions during assembly of the layers.

SUMMARY OF THE INVENTION

In view of the above, it is an object of the present invention to provide rapid prototyping systems and methods that are relatively inexpensive to implement compared with conventional rapid prototyping systems and methods.

It is another object of the present invention to provide rapid prototyping systems and methods that can reduce the length of time required to produce a prototype part.

It is another object of the present invention to provide rapid prototyping systems and methods that can produce strong, functional prototype parts from relatively inexpensive raw materials.

These and other objects of the present invention are provided by methods and apparatus for rapidly prototyping a three-dimensional object from a plurality of layers wherein each layer is cut after being fused with a preceding layer. A computer model of a three-dimensional object is initially created using CAD software. The computer model is then sliced into a sequential plurality of slices. Each slice is a mathematical representation of a corresponding sequential layer of the prototype. Using the computer model slices, machine tool paths for cutting each respective sequential layer from respective sheets of material are generated.

A first sheet of material, such as thermoplastic material, is removably secured to a support structure. A first sequential layer having a peripheral edge and an exposed face is cut from the first sheet using a respective machine tool path generated for the first sequential layer. A solvent is then applied to a face of a second sheet of material. The second sheet of material is placed in contacting face-to-face relation with the first sequential layer such that the solvent fuses the face of the second sheet of material with the exposed face of the first sequential layer. A second sequential layer having a peripheral edge and an exposed face is cut from the second sheet of material along a respective machine tool path generated for the second sequential layer. The above procedure is repeated until all remaining layers of the prototype part are produced.

The peripheral edge of each layer can have various configurations to facilitate producing a contoured surface of a prototype part. For example, the peripheral edge of each layer can have a sloped configuration, an orthogonal configuration, or a stepped configuration relative to a face thereof, or some combination thereof.

According to another embodiment of the present invention, a rapid prototyping system for rapidly producing a prototype of a three-dimensional object from a plurality of layers includes a data processing system and a three-dimensional part generator in communication with the data processing system. The data processing system includes a computer running a CAD software program which is used to create a CAD drawing of the three-dimensional object. Once the CAD drawing of the prototype is complete, the user "prints" (i.e., produces) a three-dimensional prototype via the three-dimensional part generator according to the above-described method.

The present invention is advantageous because inexpensive raw materials available from most plastics suppliers can be utilized to produce strong, functional prototype parts rapidly. Prototype parts constructed according to the present invention can be produced more quickly than prototype parts constructed using conventional prototyping methods. Furthermore, prototype parts constructed according to the present invention can be stronger and more durable than prototypes constructed using conventional rapid prototyping methods.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 3A is a side view of a layer machined according to the present invention having an orthogonal configuration.

FIGS. 3B and 3C are side views of a layer machined according to the present invention having an upwardly stepped peripheral edge and a downwardly stepped peripheral edge, respectively.

FIGS. 3D and 3E are side views of a layer machined according to the present invention having a an upwardly sloped peripheral edge and a downwardly sloped peripheral edge, respectively.

FIG. 4 is a perspective view of a first sheet of material secured to a waste sheet which is, in turn, secured to a support structure, according to an embodiment of the present invention.

FIG. 5 is a side elevation view of the first sheet of material of FIG. 4 and a machining device.

FIG. 6 is a perspective view of the machining device of FIG. 5 cutting a first sequential layer from the first sheet of material according to an embodiment of the present invention.

FIG. 7 is a side elevation view of the first sequential layer being cut from the first sheet of material of FIG. 6.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
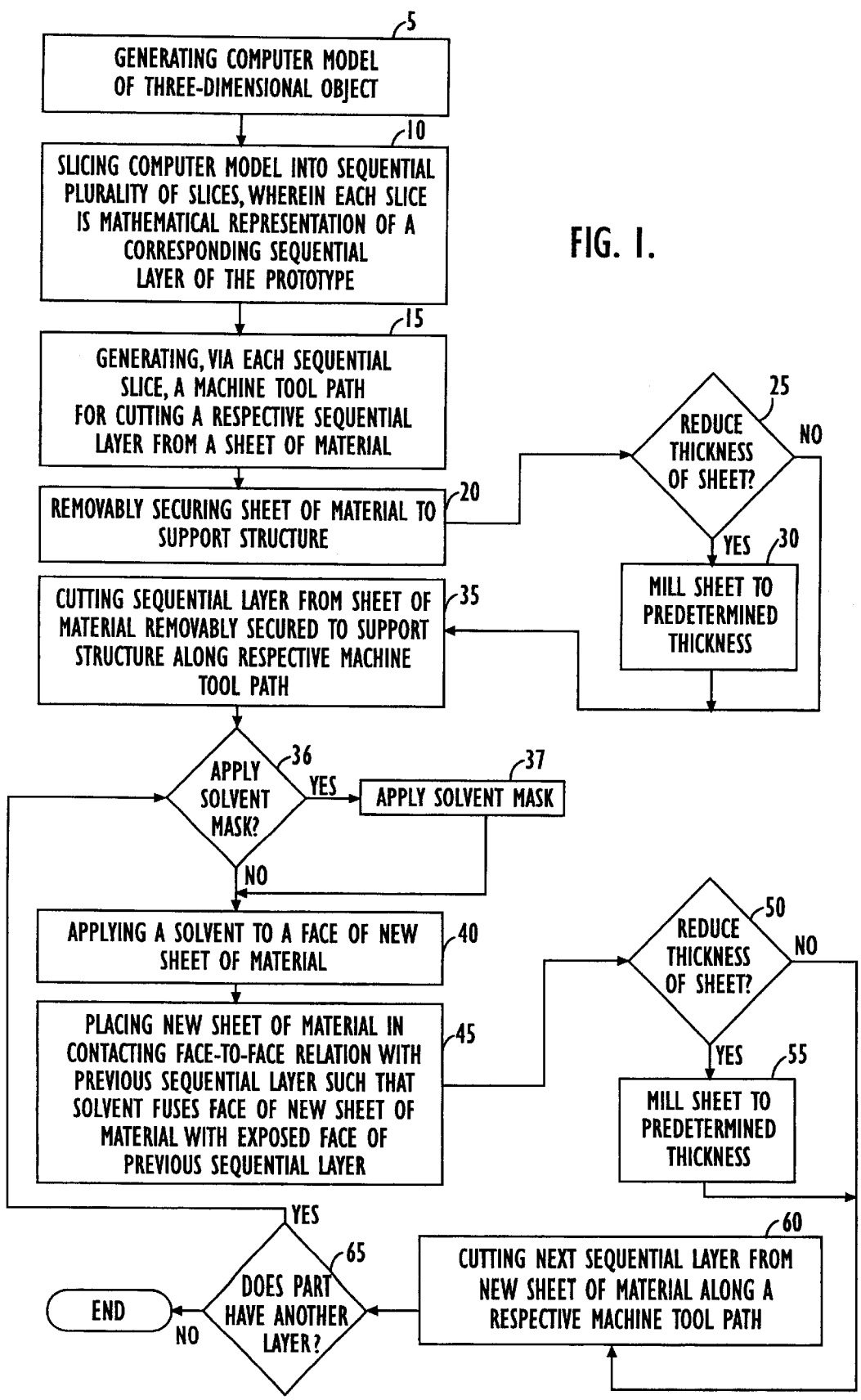
FIG. 1 is a flow chart that illustrates operations for rapidly prototyping a three-dimensional object according to the present invention.

Referring initially to FIG. 1, operations for rapidly prototyping a three-dimensional object according to the present invention are illustrated. Initially, a computer model of a three-dimensional object, for which a prototype is to be built from a plurality of layers of material, is generated (Block 5). The computer model of the three-dimensional object is sliced into a sequential plurality of slices, wherein each slice is a mathematical representation of a corresponding sequential layer of the prototype (Block 10). A respective machine tool path for cutting a respective sequential layer from a sheet of material is then generated via each sequential slice (Block 15).

A first sheet of material is removably secured to a support structure (Block 20). A determination is made whether the thickness of the sheet needs to be reduced (Block 25). Preferably, this determination is made via a data processor used in slicing a computer model of the object, as will be described below. As known to those skilled in the art of rapid prototyping, the height of a horizontal surface of a prototype part may fall between the upper and lower surfaces of an individual layer. Accordingly, to avoid a dimensional error, one or more layers may need to be milled to reduce the thickness thereof. If the thickness of the sheet needs to be reduced, the sheet is milled to a predetermined thickness (Block 30). Milling operations for reducing the thickness of a sheet of material would be understood by one of skill in the art, and need not be described further herein.

After milling operations are performed (Block 30), or after a determination is made that no milling operations are required (Block 25), a first sequential layer having a peripheral edge and an exposed face is cut from the first sheet of material along a respective machine tool path generated for the first sequential layer (Block 35).

A decision is made whether to apply a "solvent mask" to regions of the new sheet of material (or to regions of the exposed face of the preceding layer) where bonding is to be avoided (Block 36). If bonding is to be avoided in one or more regions between adjacent layers, a solvent mask is applied (Block 37).

Solvent is then applied to a face of a new sheet of material (Block 40). The new sheet of material is placed in contacting face-to-face relation with the first sequential layer such that the solvent fuses the face of the new sheet of material with the exposed face of the first sequential layer (Block 45).

A determination is made, as described above, whether the thickness of the new sheet needs to be reduced (Block 50).

If the thickness of the sheet needs to be reduced, the sheet is milled to a predetermined thickness (Block 55). After milling operations are performed (Block 55), or after a determination is made that no milling operations are required (Block 50), a second sequential layer having a peripheral edge and an exposed face is then cut from the new sheet of material along a respective machine tool path generated for the second sequential layer (Block 60). This process of determining whether a solvent mask is needed, then applying a solvent to a face of a new sheet of material and then placing the new sheet in face-to-face contact with a preceding layer is repeated until all layers of the prototype have been generated (Block 65).

Figure 2A:
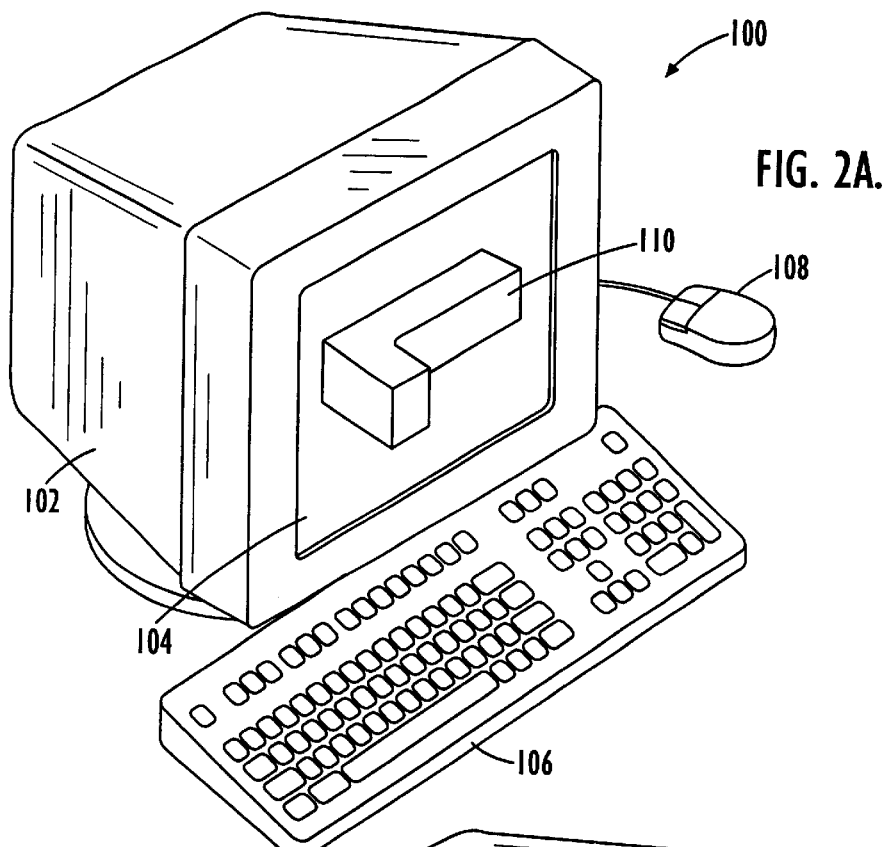
FIG. 2A is a perspective view of a Computer Aided Design (CAD) apparatus displaying a computer model of a three-dimensional object.
Figure 2B:
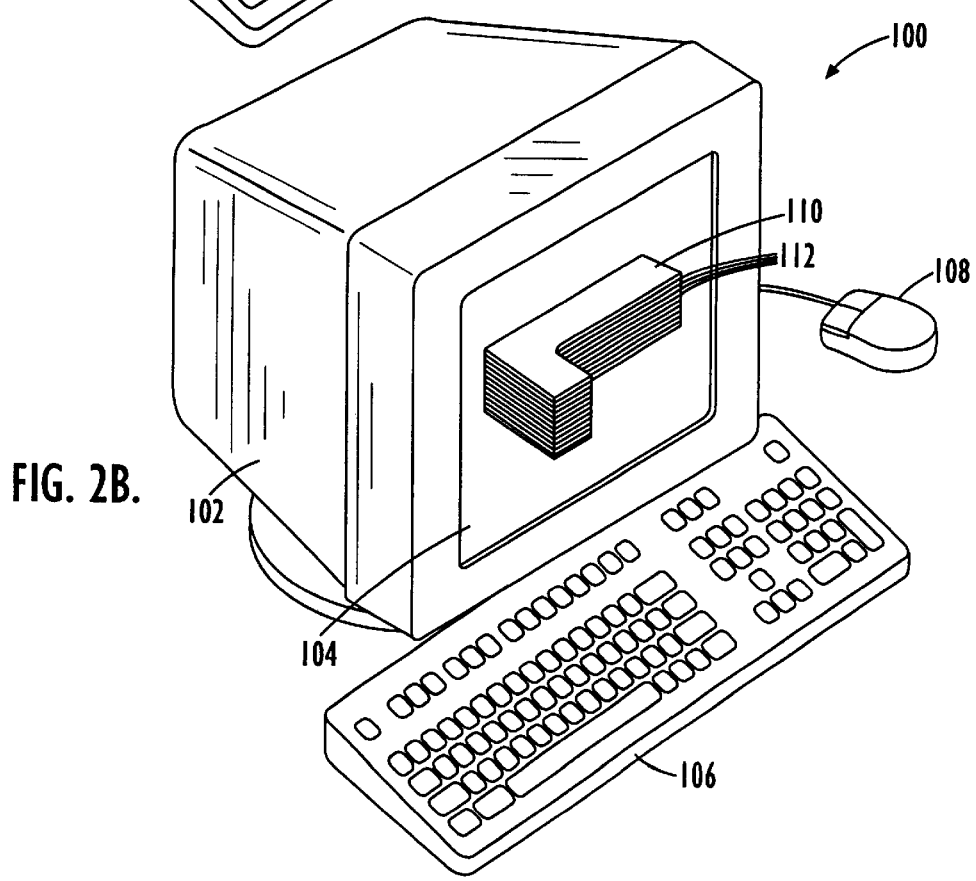
FIG. 2B is a perspective view of the computer model of FIG. 2A "sliced" into a sequential plurality of slices.

Referring now to FIGS. 2A and 2B, a Computer Aided Design (CAD) apparatus 100 for generating a computer model of a three-dimensional object is illustrated. The CAD apparatus 100 includes a computer 102 having a processor (not shown), a display 104, a keyboard 106 and a pointing device 108. A CAD software program running via the processor is used to create a design drawing by a designer who inputs information and desired data and instructions into the CAD software program via the keyboard 106 and pointing device 108. CAD systems and software are known to those of skill in the art and need not be described further herein. Exemplary CAD software programs for modeling three-dimensional objects according to the present invention include Unigraphics from Unigraphics Solutions, Inc. 13736 Riverport Drive, Maryland Heights, Mo. 63043, and ProEngineer from Parametric Technology Corporation, 128 Technology Drive Waltham, Mass. 02453.

In FIG. 2A, a CAD model 110 of a three-dimensional object for which a prototype is to be built has been created via CAD software running on the computer 102 and is displayed via the display 104. The CAD model is typically exported to a binary stereolithography (STL) file and sliced via a "slicing" software program. STL file format was originally developed by 3D Systems (www.3dsystems.com) of Valencia, Calif., and is understood by those of skill in the art. As is known by those of skill in the art, STL file format has become the industry defacto standard file format for rapid prototyping and is supported by all major CAD vendors including Unigraphics and Pro/Engineer. Software programs for slicing CAD models in STL file format are known to those of skill in the art and need not be described further herein.

In FIG. 2B, the CAD model 110 has been sliced via slicing software to produce a plurality of sequential slices 112. Each sequential slice 112 is a thin three-dimensional mathematical representation of a corresponding layer used in constructing the prototype. Accordingly, each slice defines a contour (i.e., the shape or outline) of a corresponding layer as well as the configuration of the peripheral edge of a slice (i.e., whether the peripheral edge has an orthogonal configuration relative to a face of the layer as illustrated in FIG. 3A, a stepped configuration relative to a face of the layer as illustrated in FIGS. 3B and 3C, or a sloped configuration relative to a face of the layer as illustrated in FIG. 3D and 3E).

Once the slices have been produced, a software program converts the data for each slice into software code that defines a machine tool path for each respective layer of the prototype. This software code is then exported into a file format that is accepted by a machining device that will cut each layer of a prototype. "G-code" is the file format accepted by numerical control (CNC) machining devices. G-code files contain instructions that tell a machining device which cutting tool(s) to use, the rotational speed of the cutting tool (revolutions per minute), how fast the tool should feed (inches per minute), and the X, Y, Z coordinates of the vertices that define the contours that the tool must machine for each layer.

Referring now to FIGS. 4 and 5, a first sheet of material 120a, such as thermoplastic material, is removably secured to a waste sheet 122 which is secured to a support structure 124. The waste sheet 122 allows a bit 130 of a machining device 132 (or other cutting apparatus) to completely penetrate the first thermoplastic sheet 120a without causing damage to the bit, as would be understood by those skilled in the art. The waste sheet 122 may be formed from any easily machined, dimensionally stable material which has uniform properties and is not soluble in the solvent being used including, but not limited to, medium density fiberboard (MDF) and high density polyurethane foams. The first thermoplastic sheet 120a may be removably secured to the waste sheet 122 using various techniques including, but not limited to, double-sided tape, releasable adhesive, mechanical clamping devices and vacuum techniques. Using vacuum applied through a porous waste sheet is advantageous because the thickness of tape or other adhesives does not have to be taken into consideration during the assembly of a prototype part.

Exemplary thermoplastic materials out of which layers for constructing a prototype according to the present invention are to be cut may include, but are not limited to, polystyrene, acrylonitrile-butadiene-styrene (ABS), polycarbonate, polyvinylchloride (PVC), and acrylic. These materials are particularly preferred because they are widely available in sheet form. Other materials such as fiberglass strands or electrically conductive metal powders could be added, applied to, or embedded within thermoplastic sheets to achieve desired material properties.

Various size thermoplastic sheets may be utilized in producing prototypes according to the present invention. The thickness of a thermoplastic sheet is preferably between about 0.02 inches and 0.25 inches. Accordingly, prototypes constructed according to the present invention typically have between about 4 and 50 layers per inch. This represents an order of magnitude fewer layers needed to produce a prototype as compared with conventional rapid prototyping methods wherein layers often have a thickness of only about 0.007 inches (or 143 layers per inch). As a result, prototypes constructed according to the present invention can be produced more quickly than prototypes constructed using conventional prototyping methods.

Furthermore, prototypes constructed according to the present invention are stronger and more durable than prototypes constructed using conventional prototyping methods. This is because the solvent dissolves polymer chains at the interface of the sheets being pressed together. As the solvent evaporates or is absorbed into the mass of the prototype part, bonds between polymer chains at the interface of the two sheets are established. Theoretically, the boundary between the sheets actually disappears and the bonded region's strength is equal to that of the virgin material.

If necessary, the first thermoplastic sheet 120a is milled to reduce the thickness thereof. After milling, or if milling is not required, a first sequential layer 140a is cut from the first thermoplastic sheet 120a via the machining device bit 130, as illustrated in FIGS. 6 and 7. The machine tool path that the bit 130 follows in cutting the first layer 140a from the first thermoplastic sheet 120a is shown in phantom as 134. As described above, the machine tool path 134 is derived using a corresponding slice of the CAD model 110 illustrated in FIG. 2B. When cut from the first thermoplastic sheet 120a, the first layer 140a will have an exposed face 142a and a peripheral edge 144a.

Exemplary machining devices are programmable multi-axis (i.e., 3-axis, 5-axis) CNC cutting machines, such as the Arrow 500 CNC Vertical Machining Center from Cincinnati Milacron, 4701 Marburg Ave. Cincinnati, Ohio 45209. However, it is understood that other devices may be utilized for "cutting" a layer from a thermoplastic sheet according to the present invention. For example, lasers, saws, and wire machining devices that can be configured to follow a programmed path may be serve as means for "cutting" a layer from a sheet of material.

According to the present invention, sub-layer thickness resolutions can be obtained by machining contours at various depths within a layer. As a result, unlike with prior art rapid prototyping techniques, smooth surface finishes can be obtained even with thick layers. Furthermore, the present invention incorporates "adaptive slicing" wherein the surface curvature (slope) of an object is examined to determine how thick sub-layer steps should be in order to achieve a satisfactory surface smoothness. For perfectly vertical regions within a contour, a milling cutter can cut completely through an entire layer in one pass without any loss in surface smoothness. Since that region only requires one pass of the milling cutter, a significant amount of time can be saved by preventing the milling cutter from performing unnecessary movements. For sloped or curved regions within a contour, the milling cutter can make numerous passes at different depths in order to smooth out the stair stepping effect. In addition, 5-axis machining can also be utilized to cut sloped surfaces directly.

The slicing software utilized with the present invention preferably generates cross-sectional contours that correspond to the exact height of a milling cutter within a layer. Accordingly, extremely smooth curved surfaces can be produced without sacrificing the speed advantages of using thicker layers in rapid prototyping.

While the above applies to upwardly facing and vertical surfaces, a straight milling cutter cannot perform sub-layer machining on down-facing sloped surfaces. This can be overcome by building a part in an orientation such that as few downwardly facing curved surfaces exist as possible. In addition, a part may also be built in sections and then post-assembled via manual solvent welding according to the present invention. Furthermore, a T-shaped keyway milling cutter may be utilized, as would be understood by one of skill in the art. The term "stepped configuration", as used herein, shall include peripheral edges that are stepped upwardly (FIG. 3B) and stepped downwardly (FIG. 3C). In addition, the term "sloped configuration", as used herein, shall include peripheral edges that are sloped upwardly (FIG. 3D) and sloped downwardly (FIG. 3E).

Figure 8A:
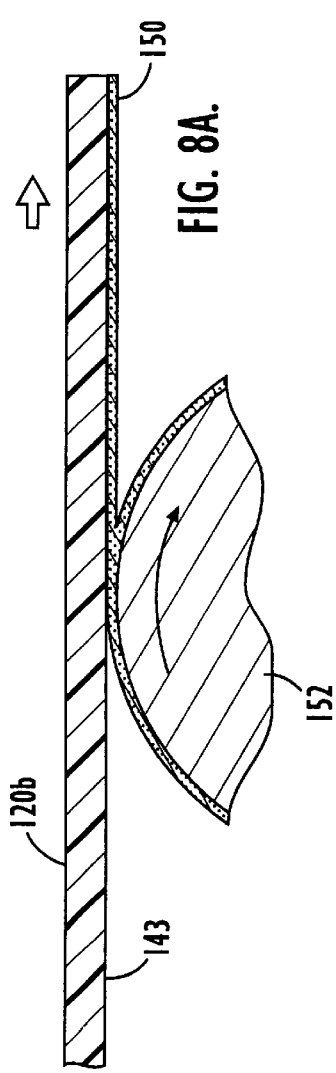
FIG. 8A is a side elevation view of an applicator applying solvent to a surface of a second sheet of material via an applicator, according to an embodiment of the present invention.

Referring now to FIG. 8A, a solvent 150, including, but not limited to, acetone, methanol, toluene, or methyl ethyl ketone (MEK), is applied to a surface 143 of a second thermoplastic sheet 120b via an applicator 152. An exemplary applicator 152 includes, but is not limited to, a roller, a brush, a spray device and the like. The thickness of the solvent 150 on the surface 143 of the second thermoplastic sheet 120b is exaggerated in FIGS. 8 and 9 for clarity. Preferably, the solvent 150 is allowed to penetrate the surface 143 for several seconds (e.g., 2–3 seconds). Excess solvent 150 is preferably discarded, either by tipping the second thermoplastic sheet 120b or by other known methods.

To prevent unwanted bonding of a sheet to scrap material from previous or future layers, a "solvent mask" or welding barrier may be applied to regions where bonding is to be prevented. A solvent mask may be applied to a face of a sheet of material prior to having solvent applied thereto. Alternatively, a solvent mask maybe applied to the exposed face of a preceding layer prior to placing a subsequent sheet of material thereon.

A solvent mask may take any number of forms. For example, a polyethylene-based paste wax can serve as an effective mask to prevent bonding from occurring. Polyethylene is insoluble in virtually all solvents, so it is an extremely effective solvent welding barrier.

A solvent mask may be applied in various ways. For example, a machining device may be configured to hold a wax stick and apply the wax stick to regions to be masked. According to another embodiment, a mask can be cut from wax paper and then inserted between layers. According to yet another embodiment, thermoplastic sheets can be fed through a laser printer mechanism in which the toner powder is insoluble in the solvent being used. Accordingly, the solvent mask can be laser printed onto a sheet as it leaves the sheet feeder.

Figure 8B:
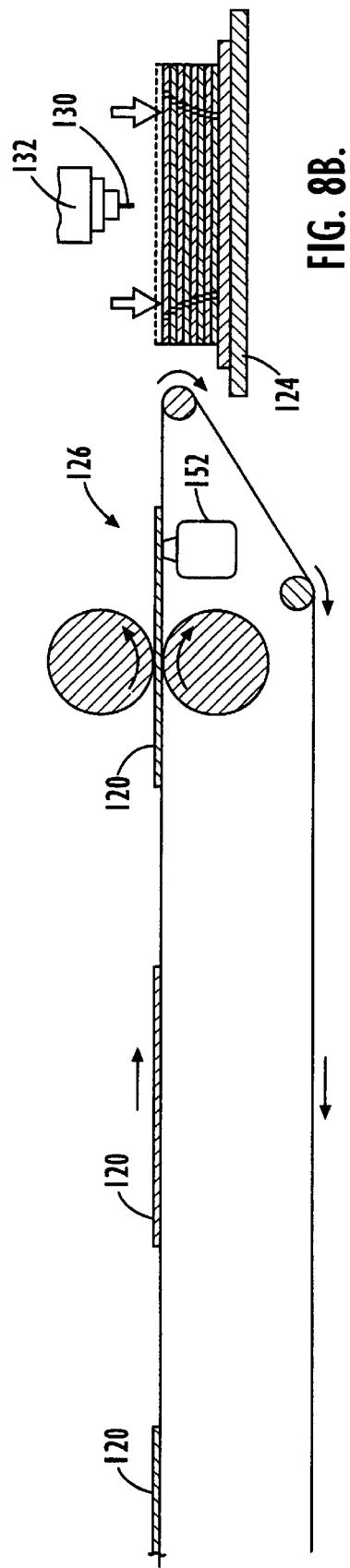
FIG. 8B is a schematic illustration of an automated process of applying solvent to the surfaces of thermoplastic sheets according to an embodiment of the present invention.

The process of applying solvent to a surface of a thermoplastic sheet according to the present invention can be automated as illustrated in FIG. 8B. In FIG. 8B, thermoplastic sheets 120 are moved via a conveyor system 126. Each sheet 120 passes over an applicator 152 that applies solvent to a surface of each sheet 120. The sheets 120 are then fed onto a support structure 124 and processed as described below. Of course, other systems for applying solvent can also be used with the present invention.

Figure 9:
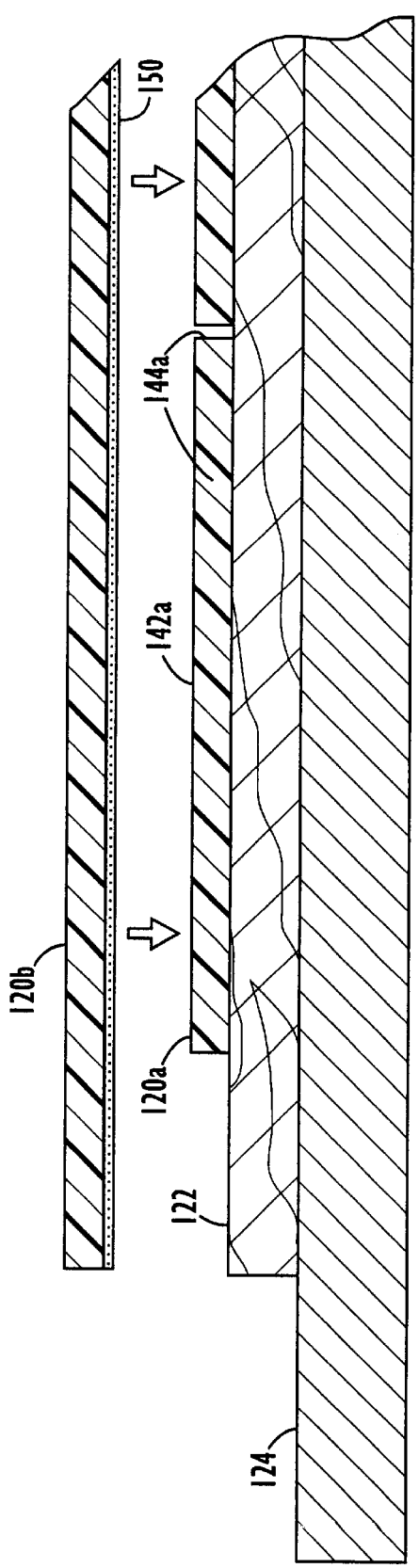
FIGS. 9–11 are side elevation views illustrating the application of a second thermoplastic sheet in contacting face-to-face relation with the first thermoplastic sheet of FIG. 7 such that the solvent is positioned therebetween, and such that the solvent fuses the face of the second sheet of material with the exposed face of the first sequential layer.
Figure 10:
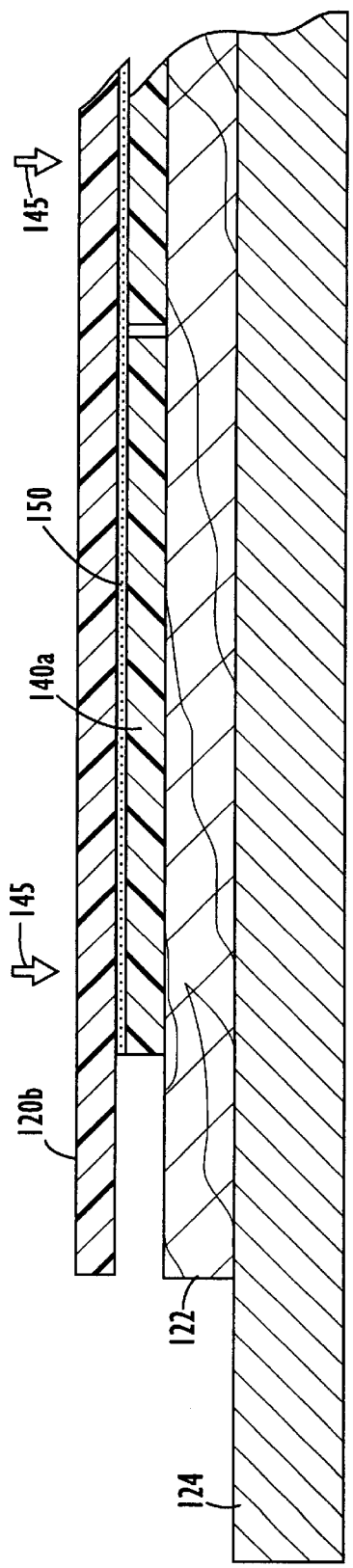
Figure 11:
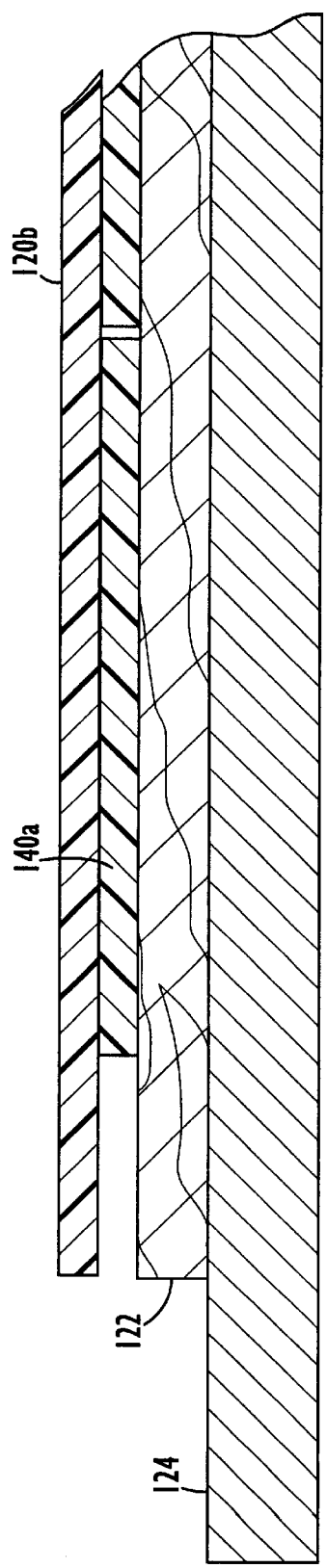

As illustrated in FIGS. 9–11, the second thermoplastic sheet 120b is placed in contacting face-to-face relation with the first sequential layer 140a such that the solvent 150 is positioned therebetween. The first layer 140a and the second thermoplastic sheet 120b are preferably held in place under load (indicated by arrows 145, FIG. 10) for several seconds (i.e., about 5 seconds). The solvent 150 causes the formation of inter-molecular bonds (van der Waal's bonds) between the surface molecules of the first sequential layer 140a and the second thermoplastic sheet 120b. As a result, the solvent 150 fuses the surface 143 of the second thermoplastic sheet 120b with the exposed face 142a of the first sequential layer 140a as illustrated in FIG. 11. It is understood, however, that various adhesives may also be utilized in bonding adjacent layers in accordance with aspects of the present invention.

When solvent masking is utilized in accordance with the present invention, it may be desirable when cutting a layer not to machine entirely through a thermoplastic sheet in order to hold nonbonded portions of a layer in place. By not machining entirely through a sheet, a thin "skin" of material (approximately 0.010" thick) can hold non-bonded portions in place. The thin skin of material can be easily peeled away when a prototype part is completed.

An advantage of the present invention is that no registration or alignment of sheets and/or layers is required. For example, the second thermoplastic sheet of material 120b may be bonded to the first sequential layer 140a without any alignment. In fact, the second thermoplastic sheet overhangs the entire peripheral edge 144a of the first sequential layer 140a. Similarly, no alignment or registration is required for any of the remaining layers.

Figure 12:
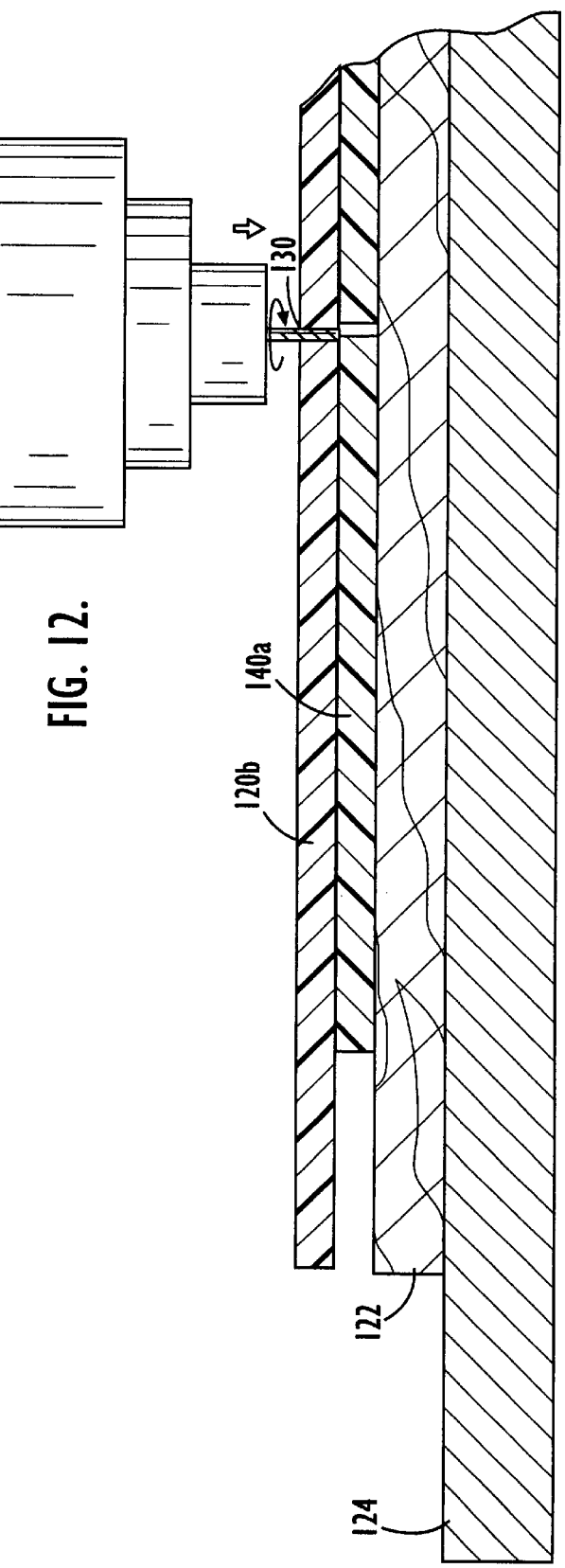
FIGS. 12 and 13 are side elevation views that illustrate the cutting of a second sequential layer from the second thermoplastic sheet of FIG. 11 according to the present invention.
Figure 13:
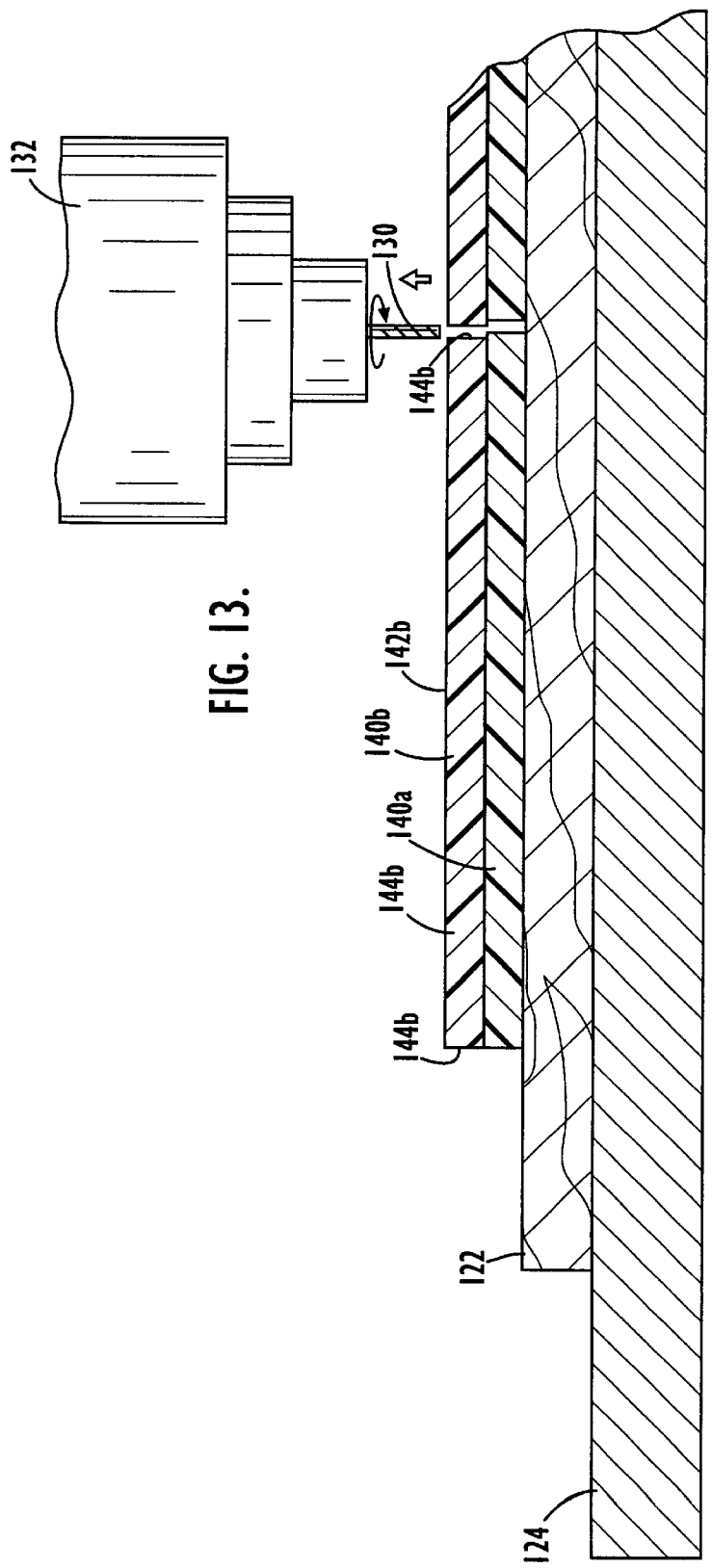

Referring now to FIGS. 12 and 13, the bit 130 from the machining device 132 cuts a second sequential layer 140b from the second thermoplastic sheet 120b by following a machine tool path for the second sequential layer 140b. As described above, the machine tool path that the bit 130 follows is derived from a corresponding second sequential slice of the CAD model 110 illustrated in FIG. 2B. When cut from the second thermoplastic sheet 120b, the second sequential layer 140b will have an exposed face 142b and a peripheral edge 144b. At the stage illustrated in FIG. 13, the prototype consists of the first and second sequential layers 140a, 140b fused together.

Figure 14:
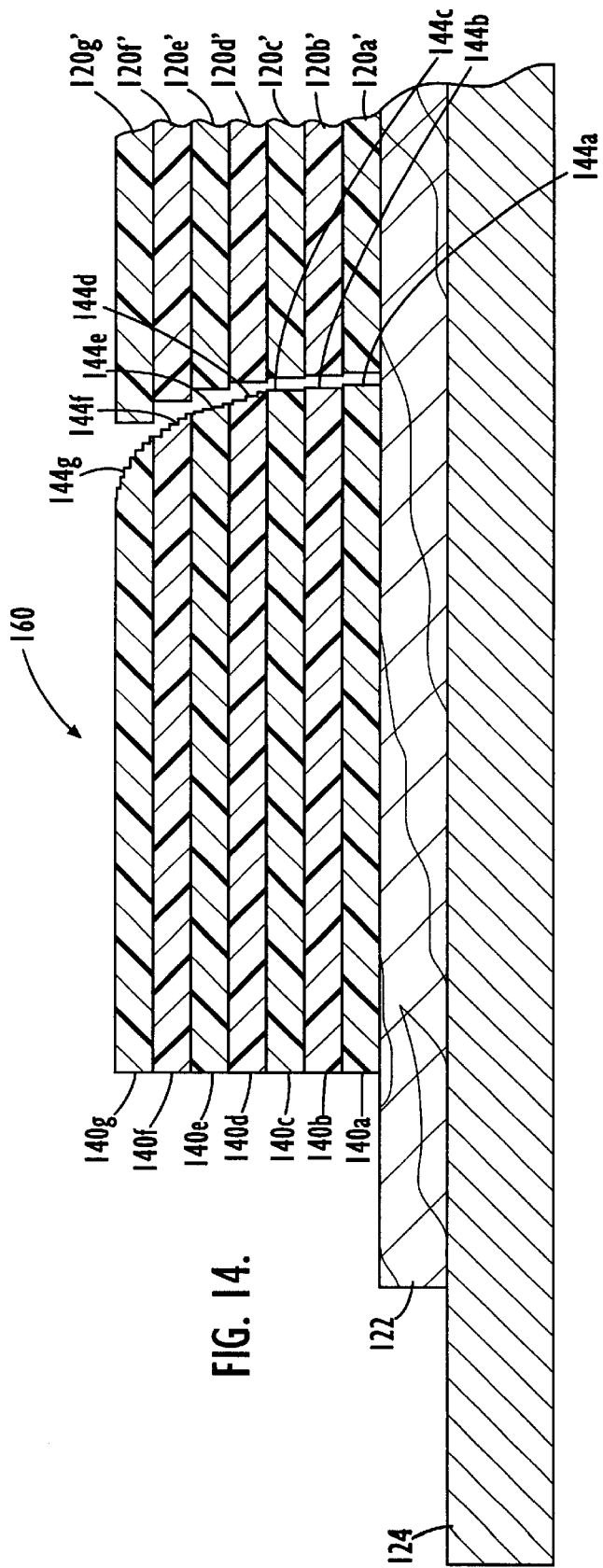
FIG. 14 is a side elevational view illustrating a completed prototype having a plurality of sequential layers fused together according to the present invention.
Figure 15:
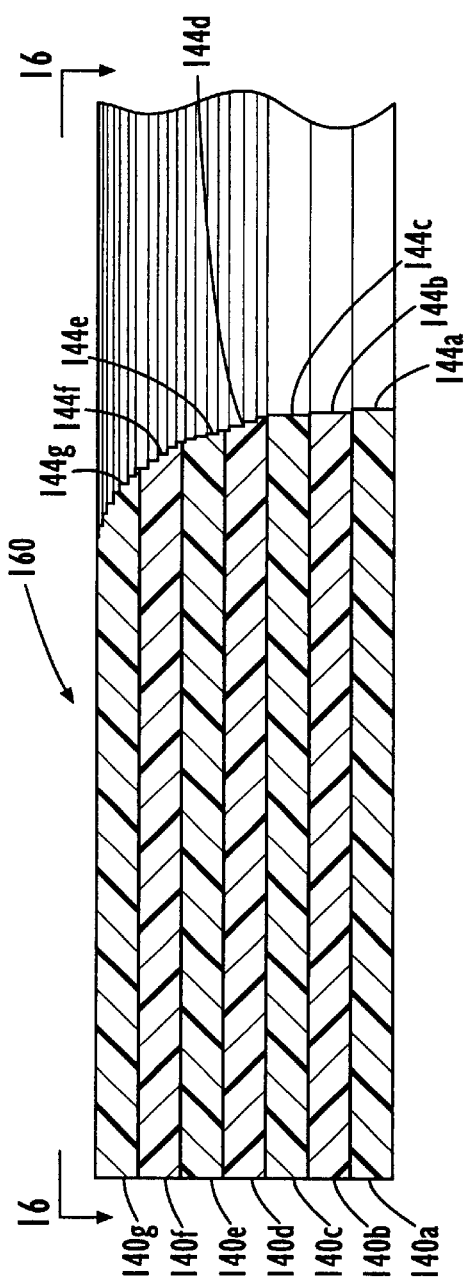
FIG. 15 is a side elevational view of a prototype part produced according to the present invention.
Figure 16:
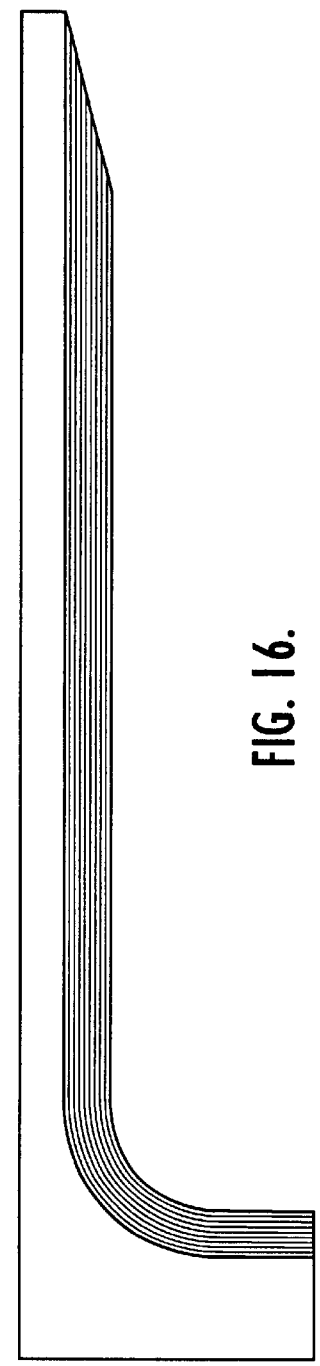
FIG. 16 is a top plan view of the prototype part of FIG. 15.

The above-described process is repeated for the remainder of the sequential layers until the prototype is completed. FIG. 14 is a side elevational view illustrating a completed prototype 160 having a plurality of sequential layers (140a–140g) fused together according to the present invention. The prototype 160 can now be removed from the waste sheet 122. The completed prototype 160 after being removed from the waste sheet 122 and the support structure 124 is illustrated in FIGS. 15 and 16.

Referring back to FIG. 14, the remaining (or waste) material (120a'–120g') from each respective thermoplastic sheet out of which each sequential layer (140a–140g) was cut, can be removed after each respective sequential layer (140a–140g) is cut or at a later time. For prototypes having portions that extend outwardly beyond lower layers, the waste material can be used as a support for upper layers until the prototype is completely assembled.

The peripheral edges (144a–144g) of the sequential layers (140a–140g) may have various configurations. For example, the peripheral edge of a layer may have an orthogonal configuration relative to a face of the layer, as illustrated by the peripheral edges 144a–144c of layers 140a–140c, respectively. The peripheral edge of a layer may have a stepped configuration relative to a face of the layer, as illustrated by the peripheral edges 144d–144g of layers 140d–140g, respectively. The stepped configuration of the peripheral edges 144d–144g gives the prototype 160 a curved appearance, as illustrated in FIG. 14. It is also understood that a peripheral edge of a layer may have various configurations. Additionally, a particular configuration need not extend around the entire contour of a layer. For example, a peripheral edge may have a stepped configuration relative to a face of the layer around part of the contour of a layer and may have a sloped configuration around another part of the contour.

The illustrated peripheral edges 144a–144g of the layers 140a–140g of the prototype 160 in FIG. 14 were cut using a machining device having 3 linear axes of movement. Machining devices having 3 axes of linear movement and 2 rotational axes of movement can be utilized to create a sloped or curved peripheral edge configuration of each layer of a prototype produced according to the present invention.

Figure 17:
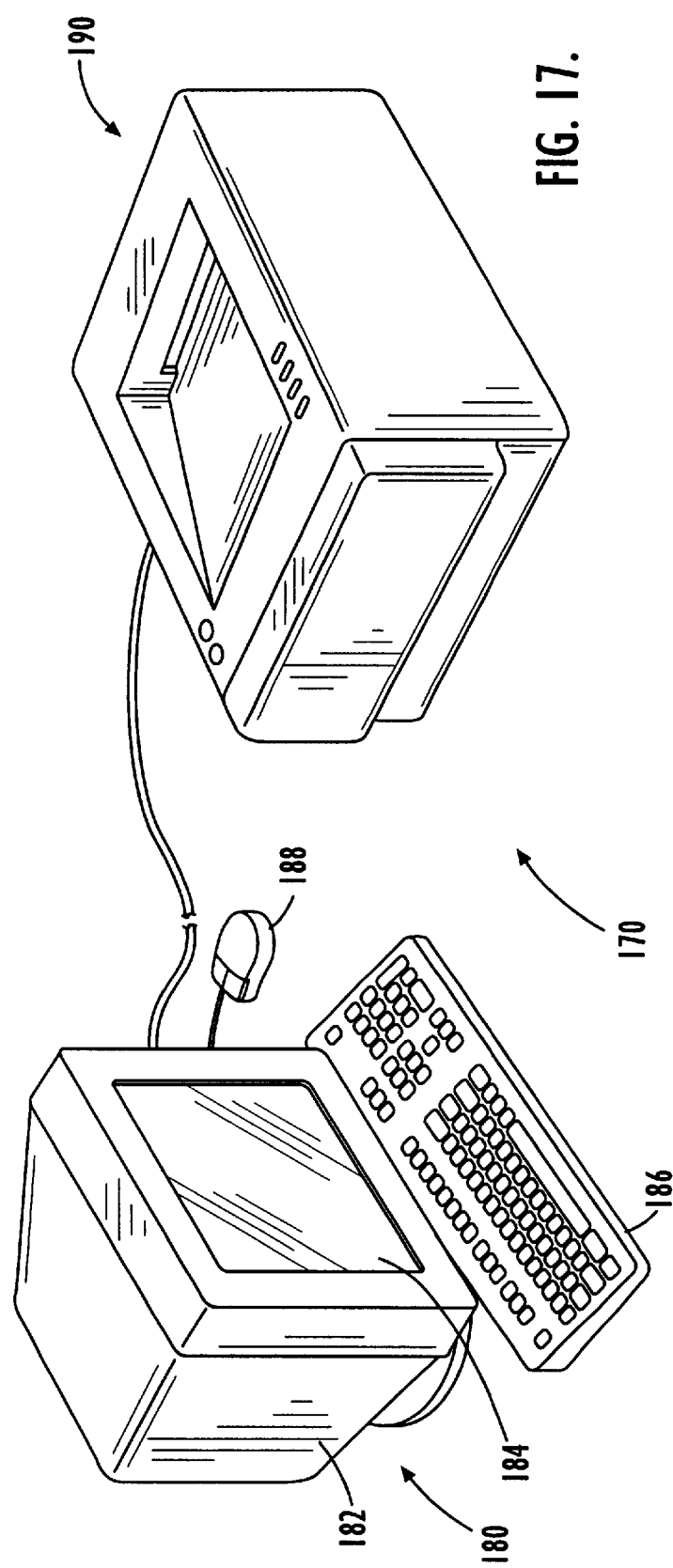
FIG. 17 illustrates a rapid prototyping system including a data processing system and a three-dimensional part printer for rapidly producing a prototype of a three-dimensional object from a plurality of layers, according to an embodiment of the present invention.

According to another embodiment of the present invention illustrated in FIG. 17, a rapid prototyping system 170 for rapidly producing a prototype of a three-dimensional object from a plurality of layers is provided. The illustrated rapid prototyping system 170 includes a data processing system 180 and a three-dimensional part generator 190 in communication with the data processing system 180.

The data processing system 180 includes a computer 182 having a processor (not shown), a display 184, a keyboard 186 and a pointing device 188. A CAD software program running via the processor is used to create a CAD drawing by a designer who inputs information and desired data and instructions into the CAD software program via the keyboard 186 and pointing device 188. Once the CAD drawing of the prototype is complete, the user "prints" (i.e., generates) a three-dimensional prototype via the three-dimensional part generator 190 using the above-described methods.

The three-dimensional part printer 190 preferably includes a 3 or 4 axis desktop milling machine (such as the MaxNC 15 machine available from MaxNC Inc., 6730 W. Chicago St., Suites 2 & 3, Chandler Ariz. 85226) for cutting layers from respective sheets of material as described above. Furthermore, the three-dimensional part printer 190 includes a sheet feeding system and an automated system for applying solvent to sheets being fed into the machining device.

Preferably the three-dimensional part printer 190 includes a tray which holds thermoplastic sheets. Grounding and/or ionizing static elimination devices are preferably utilized to reduce the build up of static electricity which can be hazardous in the presence of flammable solvents. A sheet feeder automatically withdraws one sheet at a time from the tray. According to one embodiment, a solvent mask is applied to selective areas of a thermoplastic sheet via a laser printing device within the three-dimensional part printer 190.

The thermoplastic sheet is then fed over a device which automatically applies solvent to the thermoplastic sheet. In one embodiment, a tank full of solvent sits beneath the thermoplastic sheet. As the thermoplastic sheet proceeds forward, it passes over a roller which is partially submerged in the solvent tank. As the roller spins, it brings solvent up into contact with the underside of the thermoplastic sheet. Another possible method of application in this orientation is a system which sprays a "wave" of liquid solvent up towards the underside of the thermoplastic sheet.

According to another embodiment, a solvent tank may be positioned above the thermoplastic sheet. As the thermoplastic sheet passes beneath the tank, a cover on the underside of the tank is retracted so that solvent drains out of the tank through holes and onto the top surface of the thermoplastic sheet. A waste sheet onto which the part is attached is actually upside down in this case, and is positioned above the thermoplastic sheet being fed into the machining chamber. The solvent is on the top side of the next thermoplastic sheet to be applied, so the thermoplastic sheet is pressed upwards towards the waste sheet. Since the part is now upside down, the CNC milling tool must be configured so that it machines upside down. The advantage of producing the part upside down is that gravity does not cause excess liquid solvent to come into contact with any of the previously machined surfaces. Another advantage is that machined chips can fall harmlessly away from the inverted part and do not come in contact with any liquid solvent.

As solvent vapors are typically flammable and harmful to inhale, it is also recommended that the system either be properly vented or equipped with a suitable air filtration system such as one that uses activated carbon filters.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are That which is claimed is:

1. A method of producing a prototype of a three-dimensional object comprising a plurality of layers, the method comprising the steps of:
generating a computer model of the three-dimensional object, wherein the computer model is comprised of a sequential plurality of slices, and wherein each slice is a mathematical representation of a corresponding sequential layer of the prototype;
generating, from each respective sequential slice, a respective machine tool path for cutting a respective sequential layer from a respective sheet of material;
cutting a first sequential layer having a peripheral edge and an exposed face from a first sheet of material along a respective machine tool path generated for the first sequential layer;
applying a solvent to a face of a second sheet of material;
placing the second sheet of material in contacting face-to-face relation with the first sequential layer such that the solvent fuses the face of the second sheet of material with the exposed face of the first sequential layer; and
cutting a second sequential layer having a peripheral edge and an exposed face from the second sheet of material along a respective machine tool path generated for the second sequential layer.

2. A method according to claim 1 further comprising the step of reducing a thick of the first sheet of material prior to the step of cutting a first sequential layer therefrom.

3. A method according to claim 1 further comprising the step of reducing a thickness of the second sheet of material prior to the step of cutting a second sequential layer therefrom.

4. A method according to claim 1 further comprising the step of applying a solvent mask to at least one portion of the face of the second sheet of material prior to the step of applying a solvent thereto.

5. A method according to claim 1 further comprising the step of applying a solvent mask to at least one portion of the exposed face of the first layer prior to the step of placing the second sheet of material in contacting face-to-face relation therewith.

6. A method according to claim 1 further comprising the steps of:
applying a solvent to a face of a third sheet of material;
placing the third sheet of material in contacting face-to-face relation with the second sequential layer such that the solvent fuses the face of the third sheet of material with the exposed face of the second sequential layer; and
cutting a third sequential layer having a peripheral edge and an exposed face from the second sheet of material along a respective machine tool path generated for the third sequential layer.

7. A method according to claim 1 wherein the first sheet of material is removably secured to a support structure.

8. A method according to claim 1 wherein the steps of cutting the first and second layers is performed via a multi-axis milling machine.

9. A method according to claim 1 wherein the first and second sheets of material comprise thermoplastic material selected from the group consisting of polystyrene, acrylonitrile-butadiene-styrene (ABS), polycarbonate, polyvinylchloride (PVC), and acrylic.

10. A method according to claim 1 wherein the solvent is selected from the group consisting of acetone, methanol, toluene, and methyl ethyl ketone (MEK).

11. A method according to claim 6 wherein the third sheet of material comprises thermoplastic material selected from the group consisting of polystyrene, acrylonitrile-butadiene-styrene (ABS), polycarbonate, polyvinylchloride (PVC), and acrylic.

12. A method according to claim 6 wherein the solvent is selected from the group consisting of acetone, methanol, toluene, and methyl ethyl ketone (MEK).

13. A method according to claim 1 wherein the first sequential layer peripheral edge comprises a sloped configuration.

14. A method according to claim 1 wherein the first sequential layer peripheral edge comprises a stepped configuration.

15. A method according to claim 1 wherein the second sequential layer peripheral edge comprises a sloped configuration.

16. A method according to claim 1 wherein the second sequential layer peripheral edge comprises a stepped configuration.

17. A method according to claim 1 wherein the first and second sequential layers have a thickness of between about 0.02 inches and about 0.25 inches.

18. A method of producing a prototype of a three-dimensional object comprising a plurality of layers, the method comprising the steps of:
generating a computer model of the three-dimensional object, wherein the computer model is comprised of a sequential plurality of slices, and wherein each slice is a mathematical representation of a corresponding sequential layer of the prototype;
generating, from each respective sequential slice, a respective machine tool path for cutting a respective sequential layer from a respective sheet of thermoplastic material;
cutting a first sequential layer having a peripheral edge and an exposed face from a first sheet of thermoplastic material along a respective machine tool path generated for the first sequential layer, wherein the first sequential layer has a thickness of between about 0.02 inches and about 0.25 inches;
applying a solvent to a face of a second sheet of thermoplastic material;
placing the second sheet of thermoplastic material in contacting face-to-face relation with the first sequential layer such that the solvent fuses the face of the second sheet of thermoplastic material with the exposed face of the first sequential layer; and
cutting a second sequential layer having a peripheral edge and an exposed face from the second sheet of thermoplastic material along a respective machine tool path generated for the second sequential layer, wherein the second sequential layer has a thickness of between about 0.02 inches and about 0.25 inches.

19. A method according to claim 18 further comprising the step of reducing a thickness of the first sheet of thermoplastic material prior to the step of cutting a first sequential layer therefrom.

20. A method according to claim 18 further comprising the step of reducing a thickness of the second sheet of thermoplastic material prior to the step of cutting a second sequential layer therefrom.

21. A method according to claim 18 further comprising the step of applying a solvent mask to at least one portion of the face of the second sheet of thermoplastic material prior to the step of applying a solvent thereto.

22. A method according to claim 18 further comprising the step of applying a solvent mask to at least one portion of the exposed face of the first layer prior to the step of placing the second sheet of thermoplastic material in contacting face-to-face relation therewith.

23. A method according to claim 18 further comprising the steps of:
   applying a solvent to a face of a third sheet of thermoplastic material;
   placing the third sheet of thermoplastic material in contacting face-to-face relation with the second sequential layer such that the solvent fuses the face of the third sheet of thermoplastic material with the exposed face of the second sequential layer; and
   cutting a third sequential layer having a peripheral edge and an exposed face from the second sheet of thermoplastic material along a respective machine tool path generated for the third sequential layer.

24. A method according to claim 18 wherein the first sheet of thermoplastic material is removably secured to a support structure.

25. A method according to claim 18 wherein the steps of cutting the first and second layers is performed via a laser.

26. A method according to claim 18 wherein the steps of cutting the first and second layers is performed via a multi-axis milling machine.

27. A method according to claim 18 wherein the first and second sheets of thermoplastic material comprise material selected from the group consisting of polystyrene, acrylonitrile-butadiene-styrene (ABS), polycarbonate, polyvinylchloride (PVC), and acrylic.

28. A method according to claim 18 wherein the solvent is selected from the group consisting of acetone, methanol, toluene, and methyl ethyl ketone (MEK).

29. A method according to claim 23 wherein the third sheet of thermoplastic material comprises material selected from the group consisting of polystyrene, acrylonitrile-butadiene-styrene (ABS), polycarbonate, polyvinylchloride (PVC), and acrylic.

30. A method according to claim 23 wherein the solvent is selected from the group consisting of acetone, methanol, toluene, and methyl ethyl ketone (MEK).

31. A method according to claim 23 wherein a peripheral edge of at least one of the first, second and third sequential layers has a sloped configuration.

32. A method according to claim 23 wherein a peripheral edge of at least one of the first, second and third sequential layers has a stepped configuration.

33. An apparatus for producing a prototype of a three-dimensional object comprising a plurality of layers, the apparatus comprising:
   a data processing apparatus for generating a computer model of the three-dimensional object, wherein the computer model is comprised of a sequential plurality of slices, wherein each slice is a mathematical representation of a corresponding sequential layer of the prototype, and wherein the data processing apparatus comprises means for generating, from each respective sequential slice, a respective machine tool path for cutting a respective sequential layer from a respective sheet of material;
   means for cutting a first sequential layer having a peripheral edge and an exposed face from a first sheet of material along a respective machine tool path generated for the first sequential layer;
   means for applying a solvent to a face of a second sheet of material;
   means for placing the second sheet of material in contacting face-to-face relation with the first sequential layer such that the solvent fuses the face of the second sheet of material with the exposed face of the first sequential layer; and
   means for cutting a second sequential layer having a peripheral edge and an exposed face from the second sheet of material along a respective machine tool path generated for the second sequential layer.

34. An apparatus according to claim 33 further comprising means for reducing a thickness of the first and second sheets of material.

35. An apparatus according to claim 33 further comprising means for applying a solvent mask to at least one portion of the face of the second sheet of material.

36. An apparatus according to claim 33 further comprising means for applying a solvent mask to at least one portion of the exposed face of the first layer.

37. An apparatus according to claim 33 further comprising:
   means for applying a solvent to a face of a third sheet of material;
   means for placing the third sheet of material in contacting face-to-face relation with the second sequential layer such that the solvent fuses the face of the third sheet of material with the exposed face of the second sequential layer; and
   means for cutting a third sequential layer having a peripheral edge and an exposed face from the second sheet of material along a respective machine tool path generated for the third sequential layer.

38. An apparatus according to claim 33 further comprising means for removably securing the first sheet of material to a support structure.

39. An apparatus according to claim 33 wherein the means for cutting the first and second layers comprises a multi-axis milling machine.

40. An apparatus according to claim 33 wherein the means for cutting the first and second sequential layers comprises means for producing a peripheral edge of at least one of the first and second sequential layers with a stepped configuration.

41. An apparatus according to claim 33 wherein the means for cutting the first and second sequential layers comprises means for producing a peripheral edge of at least one of the first and second sequential layers with a sloped configuration.

42. An apparatus according to claim 33 wherein the first, second and third sheets of material comprise thermoplastic material selected from the group consisting of polystyrene, acrylonitrile-butadiene-styrene (ABS), polycarbonate, polyvinylchloride (PVC), and acrylic.

43. A rapid prototyping system for rapidly producing a prototype of a three-dimensional object comprising a plurality of layers, the system comprising:
   a data processing system, comprising:
      means for generating a computer model of the three-dimensional object;
      means for slicing the computer model into a sequential plurality of slices, wherein each slice is a mathematical representation of a corresponding sequential layer of the prototype; and
      means for generating, from each respective sequential slice, a respective machine tool path for cutting a respective sequential layer from a respective sheet of material;

a three-dimensional part generator in communication with the data processing system, comprising:

means for removably securing a first sheet of material to a supporting structure;

means for cutting a first sequential layer having a peripheral edge and an exposed face from the first sheet of material along a respective machine tool path generated for the first sequential layer;

means for applying a solvent to a face of a second sheet of material;

means for placing the second sheet of material in contacting face-to-face relation with the first sequential layer such that the solvent fuses the face of the second sheet of material with the exposed face of the first sequential layer; and means for cutting a second sequential layer having a peripheral edge and an exposed face from the second sheet of material along a respective machine tool path generated for the second sequential layer.

44. A rapid prototyping system according to claim 43 further comprising means for reducing a thickness of the first and second sheets of material.

45. A rapid prototyping system according to claim 43 further comprising means for applying a solvent mask to at least one portion of the face of the second sheet of material.

46. A rapid prototyping system according to claim 43 further comprising means for applying a solvent mask to at least one portion of the exposed face of the first layer.

47. A rapid prototyping system according to claim 43 further comprising:

means for applying a solvent to a face of a third sheet of material;

means for placing the third sheet of material in contacting face-to-face relation with the second sequential layer such that the solvent fuses the face of the third sheet of material with the exposed face of the second sequential layer; and means for cutting a third sequential layer having a peripheral edge and an exposed face from the second sheet of material along a respective machine tool path generated for the third sequential layer.

48. A rapid prototyping system according to claim 47 further comprising means for sequentially feeding the second and third sheets of material into the generator.

49. A rapid prototyping system according to claim 47 wherein the means for cutting the first, second and third sequential layers from respective first, second and third sheets of material comprises a multi-axis milling machine.

50. A rapid prototyping system according to claim 47 wherein the means for cutting the first, second and third sequential layers from respective first, second and third sheets of material comprises a laser.

* * * * *